United States Patent Office 3,396,141
Patented Aug. 6, 1968

3,396,141
ORGANIC ACID RESISTANT COMPOSITIONS
FROM EPOXY RESINS, POLYCARBAMATES
AND CLAY
Ernest E. Weller, Sayreville, N.J., assignor to Tile Council of America, Inc., New York, N.Y., a corporation of New York
No Drawing. Continuation-in-part of application Ser. No. 391,319, Aug. 21, 1964. This application July 6, 1965, Ser. No. 469,915
36 Claims. (Cl. 260—37)

This application is a continuation-in-part of copending application Ser. No. 391,319.

The present invention relates to improved adhesive compositions and more particularly to unitary compositions comprising epoxy resins and amine hardeners which may be rendered functional simply by the addition of a liquid thereto, and which produce a hard, cured resin that exhibits resistance to chemical attack, to methods of preparing such compositions and to methods of using them.

It is widely known that the use of epoxy resin compositions for many applications is prompted by the ability of these materials, when cured, to withstand deterioration from a great variety of severe corrosion, e.g., chemical environments, and to form strong, adherent bonds to many different material surfaces. Epoxy resin compositions that are cured at elevated temperatures exhibit great resistance to and stand up well under such corrosion environments. Frequently circumstances, including cost and convenience, dictate that a room temperature hardening material be employed in chemical-containing environments.

It is well known, however, that the resistance of room temperature cured epoxies to certain chemical environments is low and in many instances completely unsatisfactory, and therefore such materials are ordinarily not used in areas where they are likely to be subjected to chemical attack.

Room temperature cured epoxy resin polymers are generally formed by bringing together an epoxide resin monomer or prepolymer and a liquid amine hardener. The two basic components are mixed intimately and the cross-linking and polymerization that takes place results in a product having the properties discussed above.

It is an object of the present invention to provide unitary polyepoxide resin compositions which are activated by the addition of a liquid thereto.

Another object is to provide unitary polyepoxide resin compositions of the type described which are capable of curing to exhibit improved resistance to deterioration when exposed to chemical environments, especially organic acids.

It is another object of the present invention to provide means for making unitary epoxide compositions which are activated by the addition of a liquid thereto and subsequently cure to exhibit improved resistance to organic acids.

It is another object of the invention to provide new means and methods for installing masonry materials such as brick and tile to provide installations that are resistant to chemical environments, especially organic acids.

It is still a further object of the invention to provide new means and methods for bonding to or coating surfaces to provide installations that are resistant to chemical environments.

Other objects of the invention will in part be clear and will in part be obvious from the following description.

In accordance with the present invention there are provided unitary epoxide compositions activatable by the addition of a liquid which subsequently cure to exhibit improved chemical resistance. The unitary epoxy resin compositions of the present invention comprise epoxy resin polymers or monomers, a polyamine compound in carbamate form in accordance with copending application Ser. No. 226,156, now U.S. Patent 3,275,587.

To obtain acid resistance, there is added to the unitary compositions in a sufficient amount, a protective, reactive colloid for the large resin molecules.

More specifically, it has been discovered that when clay minerals that exhibit substantial base-exchange properties, and particularly those exhibiting comparatively high base-exchange properties and containing replaceable cations, are incorporated into a polyepoxide composition employing a polyamine in carbamate form as a water-activatable hardening agent, the polyepoxide resin composition, when cured, surprisingly exhibits increased resistance to attack by concentrated organic acids.

The present invention, in addition to providing improvements in the resistance of room temperature cured epoxy resin systems to organic acids, avoids the disadvantages of two-part epoxy resin systems and provides a unitary adhesive composition.

The carbamates of the present invention are produced by reaction of carbon dioxide with polyamine compounds as will be brought out more clearly hereinbelow. The unitary compositions are activated by decomposing the carbamate to release carbon dioxide and the free amine, which then enters into the crosslinking reaction with the epoxy resin. Decomposition of the carbamate may be effected by heat, but is preferably effected by the addition of water. When activated by addition of water, the compositions disclosed herein cure at room temperature, and there is no need to heat to effect cure. Addition of water, besides activating the polymerization reaction, also performs the function of giving fluidity to the unitary compositions, especially when the compositions are in dry, pulverulent form.

The ingredients of the unitary compositions may be solid or liquid in form but in the preferred embodiment all of the ingredients are in dry, pulverulent form, so that the composition is a free-flowing, one-part powder.

When all-powder compositions are desired, accelerators may be used to promote the cure.

Especially suitable as accelerators and preferred for use are the oxides of alkaline metals, such as magnesium oxide, calcium oxide, barium oxide and strontium oxide. When oxides of alkaline metals are employed, they combine with the carbon dioxide released from the carbamates to form alkaline metal carbonates. Some of the alkaline metal carbonates, e.g., magnesium carbonate, are even capable of hydrating, thereby eliminating from the composition excess water not required to release the amino compounds from the carbamates.

The hardeners for use in the present invention, hereinabove referred to as the carbamate form of a polyfunctional amine compound, represent an important feature of the invention and are prepared by the reaction of an anhydrous amine, polyamine or polyamine type compound with carbon dioxide. By the term "polyfunctional amines" as used herein; is meant organic compounds having at least one nitrogen atom and at least two active amino hydrogen atoms which can be on the same or different nitrogen atoms. Polyamine type compounds as used herein means polyamide and amido and polyamino compounds. Curable mixtures can be formed from epoxy resin compositions and polyfunctional amines at temperatures in the 20° C. to 30° C. range, and higher, if desired. Temperatures above 20° C. can be used when higher curing rates are desired or for any other purpose. Temperatures above 250° C., however, are not preferred.

Polyamines suitable for use in preparing the carbamate hardeners of the present invention contain 2 or more amino nitrogens and correspond to the formulae:

$$(R)_{n-1}(NH_2)_n \text{ and } R(NH_2)_2(NH)_{n-1}$$

where $n$ is an integer having a value of at least 2.

Polyfunctional amine compounds suitable for use in preparing the carbamate hardener are the aliphatic primary amines, such as ethylamine, isopropyl, n-butylamine, isobutylamine, 2-ethylhexylamine, monoethanolamine, monoisopropanolamine, beta alanine, cyclohexylamine, amides, e.g., formamide, acetamide propionamide, n-butyramide, stearamide, and the like; aromatic primary amines, such as aniline, alpha-methyl-benzylamine, and the like; heterocyclic primary amines, such as N-aminoethyl morpholine, N-aminopropyl morpholine; the aliphatic polyamines, such as ethylenediamine, diethylenetriamine, triethylenetetramine, tetraethylene-pentamine, polyethylenepolyamines, propylenediamine, dipropylenetriamine, polypropylenepolyamines, butylenediamines, pentylenediamines, hexylenediamines, octylenediamines, nonylenediamines, decylenediamines, dimethylurea, 1,3-diamino-2-propanol, 3,3'-imino-bis-(propylamine), guanidine, and the like; aromatic polyamines, such as meta- ortho- and para-phenylenediamines, 1,4-naphthalenediamine, 1,4-anthradiamine, 3,3'-biphenyldiamine, xylylenediamine, 3,4-biphenylamine, 3,4-toluenediamine, alpha, alpha' - biparatoluidine, para,para' - methylenedianiline, 1 - methoxy-6-methylmetaphenylenediamine, para,para'-sulfonyldiamine, and the like; and heterocyclic polyamines, such as piperazine, 2,5-dimethylpiperazine, melamine, 2,4-diamine-5-(amino-methyl) pyrididine, 2,4,6-triaminopyrimidine, 3,9-bis (aminoethyl) apirobi-metadioxane, and the like.

Other polyamines include the low molecular weight polyamides, which are condensation products of polycarboxylic acids, in particular, hydrocarbon dicarboxylic acids, with polyamines, particularly diamines, such as those monomeric diamines previously listed. Typical polyamides are prepared in accordance with known condensation procedures from adipic acid and hexamethylene diamine, dilinoleic acid and ethylenediamine, terephthalic acid and diethylenetriamine and the like.

Amido-amines produced by the reaction of polyamines of the type described with monocarboxylic acids or mixtures of monocarboxylic and polycarboxylic acids wherein a stoichiometric excess of the polyamine is used are suitable hardeners. Particularly suitable and preferred are those amido amines having amine numbers in excess of 400 (equivalent weight of 145 or less).

Still other illustrations of polyamines are the addition products or adducts, of polyamines, in particular diamines and triamines, and low molecular weight epoxides containing oxirane oxygen linked to vicinal carbon aroms, such as ethylene oxide, propylene oxide, butadiene dioxide, diglycidyl ether, epoxidized soybean oil, epoxidized safflower oil, and the like, and polyglycidyl polyethers of polyhydric phenols. Particularly useful polyamines are the mono- and poly-hydroxyalkyl polyalkylene polyamines which can be prepared by the addition reaction of polyalkylene polyamines, preferably ethylenediamine, propylenediamine, diethylenetriamine, dipropylene - triamine or triethylenetetramine and the like, with ethylene oxide or propylene oxide. This reaction can be conducted under pressure at temperatures of 50° C. or 55° C. to boiling in the absence of solvents or in the presence of water or an alcohol. However, the reaction is more advantageously carried out at temperatures below 40° C. and preferably below 35° C. without pressure. The amines so produced include N-hydroxyethylethylene-diamine, N, N'-bis (hydroxethyl) ethylenediamine, N-bis (hydroxyethyl) diethylenetriamine, N,N-bis (hydroxyethyl diethylenetriamine, N,N''-bis (hydroxyethyl) diethylenetriamine, N - hydroxypropyldiethylenetriamine, N,N - bis (hydroxypropyl) diethylenetriamine, N,N''-bis (hydroxypropyl) diethylenetriamine, N-hydroxyethylpropylenediamine, N - hydroxypropylpropylenediamine, N-hydroxyethyldipropylenetriamine, N,N-bis (hydroxyethyl) ditaining oxirane oxygen linked to vicinal carbon atoms, propylenetriamine, tris (hydroxyethyl) triethylenetetramine and the like. Other particularly useful epoxide-polyamine adducts can be prepared with known procedures by the addition reaction of polyglycidyl polyethers of dihydric phenols and the polyamines, in particular, polyalkylene polyamines. Of particular importance in forming these epoxide polyamine adducts are the diglycidyl diethers of dihydric phenols, such as, for example, the isomers of dihydroxydiphenylmethanes singularly or mixed and the dihydroxydiphenyldimethylpropanes singularly or mixed. Mixtures of diglycidyl polyethers of dihydric phenols containing a predominance of diglycidyl diethers of dihydric phenols can be prepared by reacting epichlorohydrin with a dihydric phenol using a molar excess of epichlorohydrin over the theoretical molar requirement. Substantially pure cuts of the diglycidyl diethers then can be obtained by fractional distillation under reduced pressure, for example. Illustratively, the polyamine or epoxide-polyamine adduct itself can be prepared by mixing the diglycidyl polyether of a dihydric phenol with a polyalkylene diamine such as diethylenetriamine, dipropylenetriamine and the like, and bringing to an elevated temperature up to about 200° C. and maintaining at such an elevated temperature for a period of from 4 to 5 hours. Alternatively, as an illustration, polyamines or epoxide polyamine adducts can be prepared by adding a diglycidyl diether of a dihydric phenol to a polyalkylene polyamine over a period of time, around three to four hours, while maintaining the reaction mixture at an elevated temperature, for example, up to about 200° C. and subsequently adding a dihydric phenol.

Additional polyamines include a low molecular weight addition products of a polyamine, preferably a polyalkylene polyamine such as those listed above and a vinyl group-containing compound. Typical vinyl group-containing compounds are, for example, ethylene, propylene, 1-butene, isobutene, acrolein, vinyl chloride, vinylidene chloride, vinyl acetate, acrylonitrile, styrene and the like. These polyamines or vinyl polyamine adducts can be prepared in accordance with known procedures by reacting a polyamine and a vinyl group-containing compound in various proportions at a temperature in the range from 20° C. to 100° C. and removing unreacted materials and low boiling materials by vacuum distillation.

Other polyfunctional amines having a total of at least two active amino hydrogen atoms to the molecule are suitable for use herein. For example, such polyfunctional amines as mixture of para,para'-methylenedianiline and metaphenylenediamine or other mixtures of two or more polyfunctional amines can be used.

The carbamates are formed by reaction of dry carbon dioxide on the anhydrous polyamine compounds described herein. In its simplest form, the reaction can be carried out by bubbling carbon dioxide through the anhydrous liquid amine or liquid amine compound. Generally an excess of carbon dioxide is used. The end of the reaction is reached when the initial exothermic reaction ceases and the temperature starts to drop. The products generally separate as crystalline solids or oily liquids which may crystallize on standing.

The carbamates decompose in water to give off gaseous carbon dioxide and the liquid amine, amide, or amido amine. The carbon dioxide may also be removed by heating leaving the liquid polyamine. Care must be taken to prevent degradation of the amine, however, due to excessive heat.

For the determination of formula weights of the carbamates gentle heating with a vacuum may be used. By other analytical techniques available, e.g., acid titrations of the decomposed carbamate in water, the following structures are indicated as being representative:

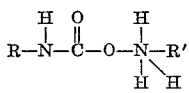

where R and R' are the same or different and are selected from the group comprising hydrogen, aliphatic hydrocarbons, amines, polyamines, polyamides and amido amines as specified herein, however only one of R or R' can be hydrogen.

The following are typical of the reactions which may be used to form such carbamates from polyamines:

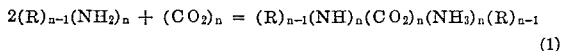

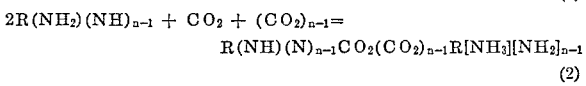

In Equations 1 and 2 $n$ is an integer having a value of at least 2, and R can be aliphatic hydrocarbons, amines, polyamines, amides, polyamides or amido-amines of the type specified herein.

By the addition of heat or a liquid such as water the reaction is reversible.

The carbamates may be prepared by reaction of dry, solid carbon dioxide on the anhydrous amines or amino compounds.

A preferred method is to add excess crushed, solid anhydrous carbon dioxide to the amine or amino compound with good mechanical mixing and volatilization of excess carbon dioxide. Excellent products ready for packaging or blending are obtained from such a technique. The low temperature of preparation seems to be a desirable feature, since the heat of reaction is rapidly dissipated.

Examples showing the way in which the carbamate hardeners may be made will now be discussed.

Carbamate hardener A

Bone dry carbon dioxide was bubbled through 100 grams of liquid diethylene triamine until the exothermic reaction was completed, as indicated by a drop in temperature. A waxy solid precipitated which when stored in a dry environment exhibits remarkable stability.

By the method of acid titration it was determined that 1½ moles of carbon dioxide were required for each mole of diethylene triamine to produce the waxy solid precipitate.

The reaction of diethylene triamine with $CO_2$ is believed to be as follows:

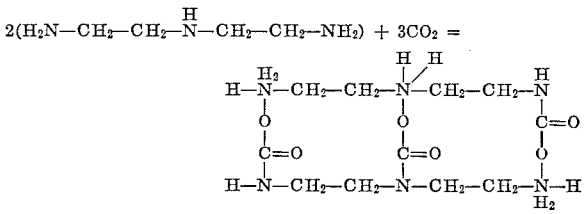

Carbamate hardener B

Bone dry carbon dioxide was bubbled through 100 grams of liquid N-tallow bis(amino-propyl) amine, a product supplied by the General Mills Corporation and known as XC–95. The reaction was continued until complete, as was noted by a drop in temperature of the reaction mixture. A waxy solid precipitated which was stable in the absence of moisture and in the presence of epoxy resin.

Carbamate hardener C

In this example a condensation product of dimeric fatty acid with polyamines in liquid form supplied by General Mills Corporation under the tradename Versamid 125 was used as the starting material. Versamid 125 is a polyamide resin which is a linear polymer derived from the condensation of dimeric fatty acid with a polyamine. It has an amine value of 290–320, a viscosity of 7–9 poises at 75° C. and a Garden color of 12 max. Bone dry carbon dioxide was bubbled through 100 grams of the liquid Versamid 125 until reaction was complete, as noted by a drop off in temperature of the reaction mixture. The waxy solid formed was separated from the reaction mixture by filtration and drying. It was stable in the absence of water and in the presence of epoxy resin.

Carbamate hardener D

To 1000 grams of an amido amine commercially available from Thiokol Chemical Company and marketed as "EM–308" was added an excess of crushed, solid, anhydrous carbon dioxide with good mechanical stirring. EM–308 is a polyamindo amine which is the condensation product of tetraethylene pentamine and tall oil. It has an amine value of 410–450, a viscosity of 2–5 poises at 25° C. The mass, which solidified rapidlly, was ground by mechanical mixing to a fine powder. The mixing was continued and the mass protected from moisture until all excess carbon dioxide had volatilized. The product was a yellowish-tan powder, extremely stable in the absence of water and in the presence of liquid epoxide resins.

Acid titration of the above carbamates after decomposing in water showed one mole of carbon dioxide had been required for each pair of amino groups available on the liquid amido amine. This is in agreement with the above formula.

Carbamate hardener E

Crushed, solid, anhydrous carbon dioxide was added to 1000 grams of an epoxy coreactant known as XR–2000 and marketed by General Mills Corporation. XR–2000 has an amine value of 580–620 and a viscosity of 20–35 poises at 25° C. Again, a solid powdered product was obtained without the use of extraneous solvents, and it too exhibits good stability under dry conditions.

Other methods of preparation may be used and fillers of various types may also be incorporated for various reasons in the above liquid amine before reacting them with the carbon dioxide.

Clay minerals have the property of sorbing certain cations and retaining these in an exchangeable state. The common exchangeable cations are calcium, magnesium and sodium, including mixtures thereof. The pH of the mineral material is indicative of the exchangeable cation that it carries, a pH of less than 7 suggesting hydrogen cations.

Clay minerals that are suitable for use in this invention are those exhibiting substantial base-exchange properties and containing replaceable cations such as alkali and alkaline-earth metals, ammonium, including mixtures thereof. Typical suitable clay minerals include montmorillonite, viz. sodium, potassium, calcium, ammonium and other bentonite clays, hectorite, saponite, attapulgite, illite, vermiculite and zeolites. These minerals, characterized by an unbalanced crystal lattice have negative charges which are normally neutralized by inorganic cations.

The clay minerals are used in an amount of at least 15 percent and preferably, at least 50 percent by weight based on the weight of epoxide resin.

The base exchange capacities of the various clay minerals enumerated run from about 15 to about 150, based upon milliequivalents of exchangeable base per 100 grams of clay. The montmorillonite and vermiculite minerals have high base-exchange capacities, e.g., 80–100 and 100–150 respectively. Attapulgite has a comparatively high base-exchange capacity, e.g. 20–30. Generally, clay minerals which have a high base-exchange capacity, i.e., of at least 20, are most useful in the present invention.

The nature of the exchangeable ion may influence the physical properties of the clay mineral and the water absorption and swelling characteristics of several of the above-noted minerals, e.g., montmorillionites. Although this is important for many applications, it does not appear significant in the compositions of the present invention as will be seen in the accompanying examples.

Most suitable and preferred clay minerals for use in this invention are refined and substantially contaminant and grit free swelling and non-swelling montmorillonite minerals and bentonites of the Western and Southern types, attapulgite and vermiculite. Typical of the preferred materials are the sodium, calcium, ammonium montmorillonites including mixtures thereof, bentonite clays comprising sodium, calcium and ammonium montmorillonite minerals, attapulgite and vermiculite mineral-containing clays.

The resinous epoxides suitable for use in the present invention comprise those compounds having at least two epoxy groups, i.e., at least two

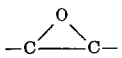

groups per molecule. The polyepoxides may be saturated or unsaturated, cycloaliphatic, aromatic, heterocyclic, or preferably aliphatic, and may be substituted if desired with substituents such as chlorine atoms, hydroxyl groups, ether radicals, and the like. They may also be monomeric or polymeric. The epoxy may be either present as a terminal or interior group.

Examples of the polyepoxides include, among others, the diacetate of epoxidized triglycerides as epoxidized glycerol trioleate and epoxidized glycerol trilinoleate, glycerol dioleate, 1,4-bis(2,3-epoxypropoxy) benene, 1,3-bis(2,3,-epoxypropoxy) benzene, 4,4'-bis(2,3-epoxypropoxy) diphenyl ether, 1,8-bis(2,3-epoxypropoxy)-octane, 1,4-bis(2,3-epoxypropoxy) - cyclohexane, 4,4'-bis(2-hydroxy - 3,4 - epoxybutoxy)-diphenyldimethylmethane, 1,3-bis-(4,5-epoxypentoxy)-5 - chloro - benzene, 1,4-bis(3,4-epoxybutoxy) - 2 - chlorocyclohexane, 1,3-bis(2-hydroxy-3,4-epoxybutoxy) benzene, 1,4-bis and (2-hydroxy-4,5-epoxypentoxy) benzene.

Other examples include the epoxy polyethers of polyhydric phenols obtained by reacting a polyhydric phenol with a halogen containing epoxide in an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (bisphenol A), 2,2-bis(4-hydroxyphenol) butane, 4,4'-dihydroxy-benzophenone, bis(4-hydroxyphenyl) ethane, 2,2-bis(4-hydroxyphenol) pentane, and 1,5-dihydroxynaphthalene. The halogen-containing epoxides may be further exemplified by 3-chloro - 1,2 - epoxybutane, 3-bromo-1,3-epoxyhexane, 3-chloro-1,2-epoxyoctane, and the like.

Preferred polyepoxides of this type are the glycidyl polyethers of dihydric phenols produced by this method from dihydric phenols and epichlorohydrin. The monomer products of this type may be represented by the general formula:

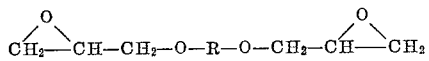

wherein R represents a divalent hydrocarbon radical of the dihydric phenol. The polymeric products will generally not be a single simple molecule but will be a complex mixture of glycidyl polyethers of the general formula:

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and epichlorohydrin is an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxy resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins" (Shell Chemical Corporation), "Gen Epoxy" (General Mills), "DER Resins" (Dow Chemical Company), "Araldite" (Ciba), "ERL Resins" (Bakelite Corporation), "Epi-Rez" (Jones Dabney), and "Epiphen" (The Borden Company).

Another group of polyepoxides that may be used comprise the glycidyl ethers of novalac resins, which resins are obtained by condensing an aldehyde with a polyhydric phenol. A typical member of this class is the epoxy resin formed from formaldehyde 2,2-bis(5-hydroxyphenol) propane novalac resin which contains as predominant constituent the substance represented by the formula

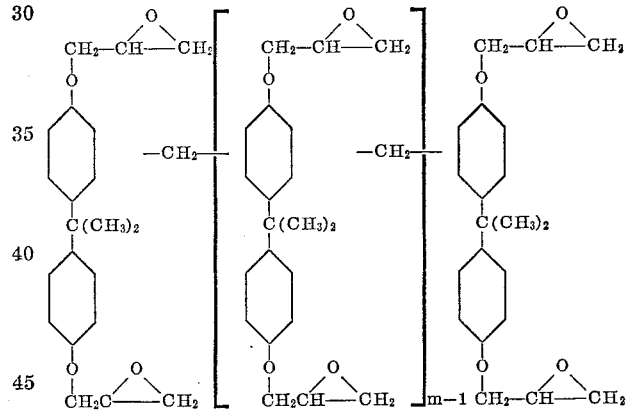

wherein $m$ is a value of at least 1.0.

Another group of polyepoxides include the glycidyl polyethers of a polyhydric phenol which has two hydroxyaryl groups separated by an aliphatic chain of at least six carbon atoms in the chain and with the chain being attached by carbon-to-carbon bonding to a nuclear atom of the hydrovyl aryl groups. Suitable phenols used for preparing these resins comprise those obtained by condensing phenol with a phenol having an aliphatic side chain with one or more olefinic double bonds positioned in the chain so the required separating atoms are present between two hydroxyphenol groups of the resulting polyhydric phenol. Cardanol, obtainable in known manner from cashew nut shell liquid, is a convenient source of phenols containing such side chain.

Examples of the polymeric-type polyepoxides include the polyepoxypolyhydroxy polyethers obtained by reacting, preferably in an alkaline medium, a polyhydric alcohol or polyhydric phenol with a polyepoxide, such as the reaction product or glycerol and bis(2,3-epoxypropyl) ether, the reaction product of sorbitol and bis(2,3-epoxy-2-methylpropyl) ether, the reaction product of pentaerythritol and 1,2-epoxy-4,5-epoxypentane, and the reaction product of bis-phenol and bis(2,3-epoxy-2-methylpropyl) ether, the reaction product of resorcinol and bis(2,3-epoxypropyl) ether, and the reaction product of catechol and bis(2,3-epoxypropyl) ether.

Other polyepoxide compounds include the polymers and copolymers of the epoxy-containing monomers possessing at least one polymerizable ethylenic linkage. When this type of monomer is polymerized in the substantial absence of alkaline or acidic catalysts, such as in the presence of heat, oxygen, peroxy compound, actinic light, and the like, they undergo addition polymerization at the multiple bond leaving the epoxy group unaffected. These monomers may be polymerized with themselves or with other ethylenically unsaturated monomers, such as styrene, vinyl acetate, methacrylonitrile, acrylonitrile, vinyl chloride, vinylidene chloride, methyl acrylate, methyl methacrylate, diallyl phthalate, vinyl allyl phthalate, divinyl adipate, chlorallyl acetate, and vinyl methallyl pimelate. Illustrative examples of these polymers include poly (allyl 2,3-epoxy-propyl ether), poly(2,3-epoxypropyl crotonate), allyl 2,2-epoxypropyl etherstyrene copolymer, methallyl 3,4-epoxybutyl etherallyl benzoate copolymer, poly(vinyl 2,3-epoxypropyl ether), allyl glycidyl ether-vinyl acetate copolymer and poly(4-glycidyloxystyrene).

Another group of polyepoxides include the epoxy esters of polybasic acids, such as diglycidyl phthalate and diglycidyl adipate, diglycidyl tetrahydrophthalate, diglycidyl maleate, and the like.

Particularly preferred members of the above-described group comprise the polymers of the 2-alkenyl glycidyl ethers having a molecular weight between 300 and 1000 and an epoxy equivalency greater than 1.0 and preferably between 1.2 and 6.0.

Other polyepoxides include the polyepoxy polyethers comprising ethers of epoxy alcohols and polyhydric alcohols such as obtained by reacting, preferably in the presence of an acid-acting compound as hydrofluoric acid, polyhydric alcohols with epichlorohydrin or dichlorohydrins and then dehydrochlorinating the resulting product in the presence of an alkaline component. Examples of polyhydric alcohols that may be used for this purpose include, among others, 1,2,6-hexanetriol, 1,5-pentanediol, butylene glycol, glycerol, sorbitol, mannitol, pentaerythritol, polyallyl alcohol, polyvinyl alcohol, trimethylolpropane, bis(4-hydroxycyclohexyl)dimethylmethane, 1,4-dimethylolbenzene, and the like; polyhydric ether alcohols as triglycerol and dipentaerythritol; polyhydric thioethers, such as 2,2'-dihydroxydiethyl sulfide and 2,2'-2,3'-tetrahydroxy dipropyl sulfide; mercapto alcohols as alpha-monothioglycerol, alpha,alpha'-dithioglycerol; polyhydric alcohol partial esters such as monostearin, pentaerythritol monoacetate and the like; and halogenated polyhydric alcohols as the monochloride of pentaerythritol, monochloride or sorbitol, monochloride of glycerol, and the like.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalency greater than 1.0, and still more preferably between 1.1 and 4 and a molecular weight between 300 and 1000.

In forming the epoxy resin composition of the invention enough of the hardeners disclosed herein are admixed with the epoxy resin to insure that good hardening of the resin is achieved. The amount of the hardener mixed with the epoxy resin is capable of some variation. In general, it will vary from about 5 to 200 percent by weight based on the weight of the epoxy resin, and is preferably from about 50 to 100 percent by weight of the epoxy resin, and depending on the particular epoxy resin and amine hardeners used can be used in about stoichiometric proportions.

In making the epoxy resin compositions of this invention, if desired, a variety of resinous modifiers may be added to the epoxy resin systems disclosed herein. Among these may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols, and which may contain free carboxyl groups and/or aliphatic hydroxyls capable of reacting with the epoxy resins; vinyl resins, such as vinyl chloride, vinylidene chloride, and the like; isocyanate resins (polyurethanes), characterized by the extremely reactive —N—C—O radical, which is capable of reacting with hydroxyl groups present in the epoxy resin chain, typical of which are the monomeric diisocyanates, such as tolylene diisocyanate, diphenyl methane, 4,4'-diisocyanate, and 3,3'-butylene 4,4'-diisocyanate, fluorocarbon resins, such as polytetrafluoroethylene, polytrifluoromonochloroethylene, and the like, and silicone resins. The addition of such resinous modifiers is well understood in the art. The resinous modifiers may vary from about 1 to about 100 percent or more, by weight, based on the weight of the epoxy resin.

The epoxide resins suitable for use in the present invention may contain between about 0.20 and 15 times, and preferably between about 0.5 and 12 times, the weight of epoxy resin, of a finely divided solid material.

Suitable finely divided inert solid materials for use with the epoxy resins include fillers, such as asbestos, albalith, silica, mica, flint powder, quartz, cryolite, calcium sulfate, portland cement, limestone, atomized alumina, barytes, talc, pyrophyllite, diatomaceous earth, and other like materials. Also may be mentioned pigments, such as titanium dioxide, cadmium red, carbon black, aluminum powder, and the like.

Suitable other colorants may be added to the epoxy resin if desired. Typical of these are: National Fast Red, Calco Condensation Green A.Y., Calco Condensation Blue, Bismark Brown, Blue Lake, (13% Ponsal Blue, 10% aluminum hydrate and 77% blanc fixe), Krebs BP–179–D, Blue Lake Krebs BP–258–D, Lithol Tower, Chrome Yellow, Iron Blue, Milari Blue, Monastral Green, Maroon Toner, Chrome Green, Chrome Orange, Iron Oxide Reds, Aluminum Powder, and flatting agents like diatomaceous silica and silica aerogel. The color materials should be selected, however, so as to be non-reactive with the epoxy resins and other ingredients at atmospheric temperature, as otherwise this might cause poor storage stability and also affect the retention of adhesiveness.

The finely divided inert solid materials suitable for use herein may have an average particle size ranging between about 40 mesh and 600 mesh (U.S. Std. Series). The exact size of the inert finely divided solid materials will depend upon the particular application of the compositions.

In addition to finely divided solid materials, a wide variety of resinous modifiers may be added to the epoxy resin systems disclosed herein. Among these may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols and which may contain free carboxyl groups and/or aliphatic hydroxyls capable of reacting with the epoxy resins; vinyl resins such as vinyl chloride, vinylidene chloride and the like; and polystyrene. The resinous modifiers may vary from about 1 to about 100 percent or more, by weight, based on the weight of the epoxy resin.

When the epoxy resins are liquid, these are preferably absorbed or otherwise carried on inert materials or fillers to make an all powder composition. As an example of such inert materials may be mentioned zirconium silicate, silica aerogel, blanc fixe, talc, pyrophyllite, diatomaceous earth, and other like inert materials. The carriers for the epoxy resins are preferably in a fine state of subdivision, and have high surface areas. Good results are also achieved when aggregates or pigments, such as sand, titanium dioxide, barium oxide and the like are used in combination with such fillers.

Zirconium silicate or silicon aerogel and titanium dioxide or sand are particularly suitable as a combination carrier and pigment for the epoxy resin of the present invention. These materials in combination insure the availability of a great surface for contact of the epoxy resins and the amine when it is released from the carbamate hardener.

Liquid epoxide resins described herein through intermixture with and absorption on the inert materials and aggregates may be made subtsantially dry and can be dry mixed with the carbamate hardener, which is usually a crystalline solid. Since some of the carbamates precipitate as an oil, it may be necessary with such materials to adsorb the carbamate oil on a filler or aggregate in order to obtain an all-powder mixture. The mixtures are relatively uniform and therefore may be prepared in such manner that any portion may be removed from the whole and still retain substantially the proportion of epoxy resin and amine hardener which were originally determined to be most suitable for the particular ingredients used in making up the dry composition.

In forming the epoxy resin bonding compositions, enough of the carbamate hardener in the form described is added to the epoxy resin composition to insure that upon activation, good hardening is achieved. Preferably the hardener and epoxy resin are present in the dry compositions in stoichiometric proportions. Depending on the nature of the adhesive composition desired, however, greater or lesser amounts of the hardener may, of course, be used.

When water is added to the compositions to make them functional, i.e., to initiate and cause polymerization, the water decomposes the carbamate to release the free amine and carbon dioxide; thereby making the free amine available for reaction and hardening of the epoxide resin. Between about 5 and 30 percent by weight of water is added based on weight of entire composition to decompose the carbamate and provide a workable composition. In the absence of moisture, the unitary compositions are extremely stable.

The manner in which the present invention may be practical will be clear from the following examples.

EXAMPLE 1

Free flowing epoxide resin compositions were prepared consisting of the following materials by admixing a liquid epoxide resin on the dry, finely divided fillers listed in each composition.

Composition A: Weight parts
    Wollastonite _____ 350
    Blanc fixe _____ 150
    Titanium dioxide _____ 250
    325 mesh fine silica _____ 750
    Epoxide resin _____ 200
Composition B:
    Wollastonite _____ 350
    Bentonite _____ 150
    Titanium dioxide _____ 250
    325 mesh fine silica _____ 750
    Epoxide resin _____ 200

The epoxide resin used was of the bisphenol of acetone type, and was the reaction product of epichlorohydrin and bisphenol A, having a viscosity of about 13,000 centipoises at 20° C. and an epoxide equivalent weight of about 185 grams.

The bentonite used in Composition B was a calcium montmorillonite containing clay, substantially grit free with a particle size of less than 200 mesh. The clay mineral was about 85% calcium montmorillonite and was supplied under the trade name Montax 200. The Blanc Fixe was an inert mineral filler, barium sulfate.

To 300 grams of Composition A were added 20 grams of carbamate hardener D and 10 grams of magnesium oxide. This provided a free flowing unitary epoxide resin system which, when protected from moisture and excessive heat, exhibits extremely good stability although intimate physical contact of hardener and epoxide resin exists.

Similarly, to 300 grams of Composition B were added 20 grams of carbamate hardener D and 10 grams of magnesium oxide. This also provides a stable, free flowing unitary epoxide resin system.

The unitary epoxide system prepared from Composition A required 15% by weight of the entire mass of water to initiate reactivity of the amine liberated from the carbamate with the epoxide resin. From the resultant patse several 1 inch x 1 inch cylinders were cast which were allowed to cure for 7 days.

Similarly, the unitary epoxide system prepared from Composition B required 15% by weight of water for initiation of the reaction of the liberated amine with the epoxide resin. Again, several 1 inch x 1 inch cylinders were cast from the resultant paste and allowed to cure for 7 days.

After curing for 7 days two cylinedrs from each of the above systems were exposed to 20% lactic acid and two cylinders of each were exposed to 20% acetic acid.

Within 7 days the cylinders cast from the epoxide resin epoxide system prepared according to Composition A were badly eroded and flaking while the cylinders cast from the epoxide resin system prepared according to Composition B were surprisingly intact with no visual signs of erosion or attack.

EXAMPLE 2

Unitary epoxide resin systems for use in this example were prepared as follows:

Composition C: Weight parts
    Wollastonite _____ 350
    Attapulgite clay _____ 150
    Titanium dioxide _____ 250
    Fine silica (at least 200 mesh) _____ 750
    Epoxide resin _____ 200
    Carbamate hardener D _____ 100
    Magnesium oxide _____ 50
Composition D:
    Wollastonite _____ 350
    Bentonite _____ 150
    Titanium dioxide _____ 250
    Fine silica (at least 200 mesh) _____ 750
    Epoxide resin _____ 200
    Carbamate hardener D _____ 100
    Magnesium oxide _____ 50
Composition E:
    Wollastonite _____ 350
    Vermiculite _____ 150
    Titanium dioxide _____ 250
    Fine silica (at least 200 mesh) _____ 750
    Epoxide resin _____ 200
    Carbamate hardener D _____ 100
    Magnesium oxide _____ 50
Composition F:
    Wollastonite _____ 350
    Blanc fixe _____ 150
    Titanium dioxide _____ 250
    Fine silica (at least 200 mesh) _____ 750
    Epoxide resin _____ 200
    Carbamate hardener D _____ 100
    Magnesium oxide _____ 50

The epoxide resin used in these compositions is that of Example 1.

The attapulgite mineral used in Composition C was a needle-like particle averaging 0.12 micron in size, having a pH of 7.5–9.0 and a surface area of 200–220 sq. m./gms. It was purchased under the tradename "Attagel 30."

The bentonite mineral used in Composition D was a high-gelling grade of white Italian bentonite clay of the sodium montmorillonite type. The clay had a swelling power to 41 cc. in water, a pH of 10 and contained 85% montmorillonite mineral.

The vermiculite mineral of Composition E was an expanded grade of vermiculite ground to a fine particle size.

The above compositions were all free flowing, unitary epoxide resin systems which exhibited excellent stability in the absence of moisture and heat.

Upon the addition of 25 percent water Composition A liquified and was transformed by mixing to a smooth, white paste. The resultant mixture was used to case several 1″ x 1″ cylinders. The mixture was also found to be a very satisfactory adhesive for bonding ceramic tile to an existing cement floor. The material hardened to form a good, strong bond between the ceramic tile and cement floor in about 25–30 hours.

Similarly, Compositions D, E and F were liquified by the additions of 25 percent water based on their total weights. Each resulted in smooth pastes by mixing. Again several cylinders of each composition were cased.

The cylinders from Compositions C, D, E and F were allowed to cure for 14 days. At that time one of each was exposed to the following solutions:

|  | Percent |
|---|---|
| Acetic acid | 10 |
| Do | 20 |
| Do | 30 |
| Lactic acid | 10 |
| Do | 20 |
| Do | 30 |
| Citric acid | 10 |
| Do | 20 |
| Do | 30 |

After two days all of the Composition F cylinders exposed to 30% solutions were badly flaking. None of the mineral-containing compositions showed sign of attack.

After 7 days all of the Composition F cylinders were visibly deteriorating. Only the cylinders from Composition C which were exposed to 30% solutions showed slight rupturing due to chemical attack.

EXAMPLE 3

The unitary epoxide resin systems prepared in Example 1 were used in this example.

Each Composition A and B was activated by the addition of water and the resultant paste used to coat concrete subsurfaces. After 14 days cure at room conditions each coating was subjected to a variety of liquid solutions of organic acids. The solutions were allowed to dry slowly onto the surface over an 8 hour period. This period was followed by a water rinse and 16 hours drying. The cycle was repeated for 10 days. At that time each surface was examined and it was found that the surface coated with Composition B showed visible signs of deterioration while the surface coated with Composition A was intact and hard with no visible signs of deterioration at that time.

EXAMPLE 4

Unitary epoxide resin systems for use in this example were prepared as follows.

| Composition G: | Weight parts |
|---|---|
| Epoxide resin | 100 |
| Bentonite | 66 |
| Carbamate hardener A | 15 |
| MgO | 7.5 |
| Composition H: | |
| Epoxide resin | 100 |
| Wollastonite | 66 |
| Carbamate hardener A | 15 |
| MgO | 7.5 |

The epoxide resin used in these compositions was a liquid resin of the bisphenol of acetone type, having a viscosity of 65–95 poisies at 25° C., a maximum Gardner color of 2 and an epoxide equivalent of 180–188. It was purchased under the tradename Epon 826.

The bentonite mineral used in Composition G was an ammonium bentonite of the non-swelling type, a highly purified bentonite which had a pH of 9.5 in water and contained approximately 85% montmorillonite mineral.

Both of these compositions were thick pastes which were stable in the absence of moisture. Upon the addition of 10% by weight of the compositions of water they were transformed to viscous but workable adhesive compositions, both suitable for adhering tile or brick to each other.

When cured Composition G exhibited superior resistance when exposed to constantly dripping 20% lactic acid while Composition H swelled and became soft within 14 days.

EXAMPLE 5

The resin Compositions A and B of Example 1 were used in this example. However, to 300 grams of each Composition A and B was added 18 grams of carbamate B in place of the carbamate D and 9 grams of magnesium oxide.

As in Example 1, the resulting unitary epoxide systems were stable in the absence of moisture. Samples, cast after liquification with water, after 7 days cure gave similar results when immersed in 20% acetic acid.

EXAMPLE 6

Similar good results were obtained with resin Compositions C, D, and E of Example 2 where the carbamate hardener is carbamate hardener C in place of carbamate D.

The composition F containing no clay mineral, but containing carbamate hardener C as a replacement for carbamate D, again showed early attack when compared with Compositions C, D and E above after immersion in the acid solution shown in Example 2.

The compositions of the invention comprise bringing together a hardenable epoxy resin composition which comprises in a unitary form epoxy resin, a water activatable carbamate curing agent and various filler components and at least 15% by weight and preferably at least about 50% by weight based on the weight of the epoxy resin of clay mineral that exhibits a base exchange capacity of at least 20 milliequivalents of exchangeable base per 100 grams of clay and containing cations such as alkali and alkaline earth metals, ammonium, including mixtures thereof. On the addition of water the carbamate is decomposed releasing an active polyfunctional amine and the composition cures at room temperature.

The epoxy resin compositions of the present invention bond exceedingly well to almost any substratum and may be used as coatings, films, adhesives and filleting materials.

The invention in its broader aspects is not limited to the specific steps, methods, compositions and improvements shown and described herein, but departures may be made within the scope of the accompanying claims without departing from the principles of the invention and without sacrificing its chief advantages.

What is claimed is:

1. An epoxy resin-polyfunctional amine carbamate composition which comprises:
   (a) an epoxy resin having at least two

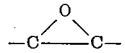

groups per molecule;
   (b) a cation containing clay mineral capable of imparting improved organic acid resistance to said composition, in a sufficient amount to impart improved organic acid resistance to said composition and in an amount of at least 10 percent by weight based on weight of epoxy resin, said clay mineral exhibiting a base-exchange capacity of at least about 15, said clay mineral comprising an exchangeable cation which is a member selected from the group consisting of ammonium, alkali and alkaline earth metal cations, and mixtures of the foregoing; and
   (c) a water activatable polyfunctional amine carbamate curing agent capable of curing said epoxy resin at about room temperature and in sufficient amount to cure said epoxy resin at about room temperature.

2. The composition of claim 1 wherein said clay mineral is present in said composition in the amount of at least about 50 percent by weight based on the weight of the epoxy resin.

3. An epoxy resin-polyfunctional amine carbamate composition which comprises:
(a) an epoxy resin having at least two

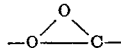

groups per molecule;
(b) a cation containing clay mineral capable of imparting improved organic acid resistance to said composition, in a sufficient amount to impart improved organic acid resistance to said composition and in an amount of at least 15 percent by weight based on weight of epoxy resin, said clay mineral exhibiting a base-exchange capacity of at least 20, said clay mineral having an exchangeable cation which is a member selected from the group consisting of ammonium, alkali and alkaline earth metal cations, and mixtures of the foregoing; and
(c) a water activatable polyfunctional amine carbamate curing agent capable of curing said epoxy resin at about room temperature and in sufficient amount to cure said epoxy resin at about room temperature.

4. A method for making a surface resistant to attack by organic acid which comprises preparing an epoxy resin adhesive coating composition, making said epoxy resin composition resistant to organic acid attack by adding to said coating composition a sufficent amount of cation containing clay mineral, exhibiting a base-exchange capacity of at least 15, to impart improved resistance to attack by organic acid to said epoxy resin composition, said clay mineral being added in an amount of at least 10 percent by weight based on said epoxy resin, said clay mineral having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, coating said surface with said composition, curing said epoxy resin composition on said surface at about room temperature and exposing said cured composition to an organic acid environment.

5. The composition of claim 3 wherein said polyfunctional amine of said carbamate comprises a member selected from the group consisting of amine, polyamine, amide, polyamide, amido amine and polyamido amine.

6. The composition of claim 3 wherein said polyfunctional amine carbamate comprises an amine carbamate.

7. The composition of claim 3 wherein said polyfunctional amine carbamate comprises a polyamine carbamate.

8. The composition of claim 3 wherein said polyfunctional amine carbamate comprises a polyamide carbamate.

9. The composition of claim 3 wherein said polyfunctional amine carbamate comprises a polyamido amine carbamate.

10. An adhesive composition which comprises:
(a) an epoxy resin having at least two

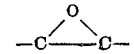

groups per molecule;
(b) a cation containing clay mineral capable of imparting improved organic acid resistance to said composition, in a sufficient amount to impart improved organic acid resistance to said composition and in an amount of at least 15 percent by weight based on the weight of epoxy resin, said clay mineral exhibiting a base-exchange capacity of at least 15, said clay mineral being a member selected from the group consisting of montmorillonite, attapulgite, hectorite, saponite, illite and zeolite and said clay mineral having an exchangeable cation which is a member selected from the group consisting of ammonium, alkali and alkaline earth metal cations, and mixtures of the foregoing; and
(c) a water activatable polyfunctional amine carbamate curing agent capable of curing said epoxy resin at about room temperature and in sufficient amount to cure said epoxy resin at about room temperature.

11. An adhesive bonding composition which comprises:
(a) an epoxy resin having at least two

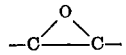

groups per molecule;
(b) a cation containing clay mineral capable of imparting improved organic acid resistance to said composition, in a sufficient amount to impart improved organic acid resistance to said composition and in an amount of at least 15 percent by weight based on the weight of said epoxy resin, said clay mineral exhibiting a base-exchange capacity of at least 20, said clay mineral being a member selected from the group consisting of montmorillonite, attapulgite, vermiculite, hectorite, saponite and illite and said clay mineral having an exchangeable cation which is a member selected from the group consisting of ammonium, alkali and alkaline earth metal cations and mixtures of the foregoing; and
(c) a water activatable polyfunctional amine carbamate curing agent capable of curing said epoxy resin at about room temperature and in sufficient amount to cure said epoxy resin at about room temperature.

12. The composition of claim 11 wherein said clay mineral consists essentially of montmorillonite.

13. The composition of claim 11 wherein said clay mineral consists essentially of attapulgite.

14. The composition of claim 11 wherein said clay mineral consists essentially of vermiculite.

15. An adhesive coating composition which comprises:
(a) an epoxy resin having at least two

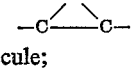

groups per molecule;
(b) a cation containing clay mineral capable of imparting improved organic acid resistance to said composition, in a sufficient amount to impart improved organic acid resistance to said composition and in an amount of at least 15 percent by weight based on the weight of epoxy resin, said clay mineral exhibiting a base-exchange capacity of at least 20, said clay mineral being a member selected from the group consisting of montmorillonite, attapulgite, vermiculite, hectorite, saponite and illite and said clay mineral having an exchangeable cation which is a member selected from the group consisting of ammonium, alkali and alkaline earth metal cations, and mixtures of the foregoing; and
(c) a water activatable polyfunctional amine carbamate curing agent capable of curing said epoxy resin at about room temperature and in sufficient amount to cure said epoxy resin at about room temperature.

16. The composition of claim 15 wherein said clay mineral consists essentially of montmorillonite.

17. The composition of claim 15 wherein said clay mineral consists essentially of attapulgite.

18. The composition of claim 15 wherein said clay mineral consists essentially of vermiculite.

19. An adhesive grout and mortar composition which comprises:
(a) an epoxy resin having at least two

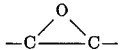

groups per molecule;
(b) a cation containing clay mineral capable of imparting improved organic acid resistance to said composition, in a sufficient amount to impart improved organic acid resistance to said composition and in an amount of at least 15 percent by weight based on the weight of epoxy resin, said clay mineral exhibiting a base-exchange capacity of at least 20, said clay mineral being a member selected from the group consisting of montmorillonite, attapulgite, vermiculite, hectorite, saponite and illite and said clay mineral having an exchangeable cation which is a member selected from the group consisting of ammonium, alkali and alkaline earth metal cations, and mixtures of the foregoing; and
(c) a water activatable polyfunctional amine carbamate curing agent capable of curing said epoxy resin at about room temperature and in sufficient amount to cure said epoxy resin at about room temperature.

20. The composition of claim 19 wherein said clay mineral consists essentially of montmorillonite.

21. The composition of claim 19 wherein said clay mineral consists essentially of attapulgite.

22. The composition of claim 19 wherein said clay mineral consists essentially of vermiculite.

23. A method for making tile surface resistant to attack by organic acid which comprises placing tile on a substrate containing a mortar so as to leave spaces between the tiles, preparing an epoxy resin adhesive composition for filling the spaces between the tiles, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral being selected from the group consisting of montmorillonite, attapulgite, hectorite, saponite and illite, said clay mineral material having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, filling the spaces between said tiles with said composition, curing said epoxy resin composition at about room temperature and exposing said cured composition and tile surface to an organic acid environment.

24. A method for making tile surface resistant to attack by organic acid which comprises placing tile on a substrate containing a mortar so as to leave spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising montmorillonite, said clay mineral material having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, filling the spaces between said tiles with said composition, curing said epoxy resin composition at about room temperature and exposing said cured composition and tile surface to an organic acid environment.

25. A method for making tile surface resistant to attack by organic acid which comprises placing tile on a substrate containing a mortar so as to leave spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising attapulgite, said clay mineral material having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, filling the spaces between said tiles with said composition, curing said epoxy resin composition at about room temperature and exposing said cured composition and tile surface to an organic acid environment.

26. A method for making tile surface resistant to attack by organic acid which comprises placing tile on a substrate containing a mortar so as to leave spaces between the tiles, preparing an epoxy resin adhesive composition for filling the spaces between the tile, making said epoxy resin composition resistant to attack by organic acid by adding to said composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising finely ground expanded vermiculite, said clay mineral material having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, filling the spaces between said tiles with said composition, curing said epoxy resin composition at about room temperature and exposing said cured composition and tile surface to an organic acid environment.

27. The method of claim 23 wherein said polyfunctional amine of said carbamate comprises a member selected from the group consisting of amine, polyamine, amide, polyamide, amido amine and polyamido amine.

28. The method of claim 23 wherein said polyfunctional amine carbamate comprises a polyamide carbamate.

29. The method of claim 23 wherein said polyfunctional amine carbamate comprises a polyamido amine carbamate.

30. A method for making a surface resistant to attack by organic acid which comprises preparing an epoxy resin adhesive coating composition, making said epoxy resin composition resistant to organic acid attack by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral being selected from the group consisting of montmorillonite, attapulgite, hectorite, saponite and illite, said clay mineral having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, coating said surface with said composition, curing said epoxy resin composition on said surface at about room temperature and exposing said cured composition to an organic acid environment.

31. A method for making a surface resistant to attack by organic acid which comprises preparing an epoxy resin adhesive coating composition, making said epoxy resin composition resistant to organic acid attack by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising montmorillonite, said clay mineral having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, coating said surface with said composition, curing said epoxy resin composition on said surface at about room temperature and exposing said cured composition to an organic acid environment.

32. A method for making a surface resistant to attack by organic acid which comprises preparing an epoxy resin adhesive coating composition, making said epoxy resin composition resistant to organic acid attack by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising attapulgite, said clay mineral having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, coating said surface with said composition, curing said epoxy resin composition on said surface at about room temperature and exposing said cured composition to an organic acid environment.

33. A method for making a surface resistant to attack by organic acid which comprises preparing an epoxy resin adhesive coating composition, making said epoxy resin composition resistant to organic acid attack by adding to said coating composition a sufficient amount of cation containing clay mineral, exhibiting a base-exchange capacity of at least 20, to impart improved resistance to attack by organic acid to said epoxy resin composition, said clay mineral being added in an amount of at least 15 percent by weight based on said epoxy resin, said clay mineral comprising finely ground expanded vermiculite, said clay mineral having an exchangeable cation which is a member selected from the group consisting of ammonium, alkali and alkaline earth metal cations, and mixtures of the foregoing, adding to said epoxy resin composition a polyfunctional amine carbamate curing agent capable of decomposing on the addition of water to release said polyfunctional amine, said released polyfunctional amine being capable of curing said epoxy resin at about room temperature, adding a sufficient amount of said carbamate to cure said epoxy resin, adding a sufficient amount of water to decompose said carbamate, coating said surface with said composition, curing said epoxy resin composition on said surface at about room temperature and exposing said cured composition to an organic acid environment.

34. The method of claim 30 wherein said polyfunctional amine carbamate comprises a member selected from the group consisting of amine, polyamine, amide, polyamide, and amido amine and polyamido amine.

35. The method of claim 30 wherein said polyfunctional amine carbamate comprises a polyamide carbamate.

36. The method of claim 30 wherein said polyfunctional amine carbamate comprises a polyamido amine carbamate.

References Cited

UNITED STATES PATENTS

| | | | |
|---|---|---|---|
| 2,934,452 | 4/1960 | Sternberg | 260—18 |
| 3,159,499 | 12/1964 | Jorda | 260—18 |
| 3,297,635 | 1/1967 | Bergman et al. | 260—37 |
| 2,944,036 | 7/1960 | Floyd et al. | 260—37 |
| 3,021,234 | 7/1962 | Casement et al. | 260—37 |
| 3,196,122 | 7/1965 | Evans | 94—3 |
| 3,228,911 | 1/1966 | Rogier | 260—37 |
| 3,275,587 | 9/1966 | Weller et al. | 260—37 |

FOREIGN PATENTS

| | | |
|---|---|---|
| 83,093 | 9/1956 | Netherlands. |

OTHER REFERENCES

Lee et al., "Epoxy Resins," McGraw Hill Book Co., New York 1957, pp. 146–147 relied upon.

Oleesky et al., "Handbook of Re-inforced Plastics," Reinhold Pub. Corp., New York 1964, pp. 226–27 relied upon.

JULIUS FROME, *Primary Examiner.*

J. E. CALLAGHAN, *Assistant Examiner.*